(12) United States Patent
Akimori et al.

(10) Patent No.: US 6,611,492 B2
(45) Date of Patent: Aug. 26, 2003

(54) OPTICAL RECORDING MEDIUM AND MASTER DISC FOR PREPARATION THEREOF

(75) Inventors: Toshihiro Akimori, Miyagi (JP); Somei Endo, Miyagi (JP); Manabu Sato, Miyagi (JP)

(73) Assignee: Sony Corporation, Tokyo (JP)

( * ) Notice: Subject to any disclaimer, the term of this patent is extended or adjusted under 35 U.S.C. 154(b) by 282 days.

(21) Appl. No.: 09/779,510

(22) Filed: Feb. 9, 2001

(65) Prior Publication Data

US 2001/0024421 A1 Sep. 27, 2001

(30) Foreign Application Priority Data

Feb. 14, 2000 (JP) .................................. 2000-039797

(51) Int. Cl.[7] .............................................. G11B 7/24
(52) U.S. Cl. ................................................... 369/275.4
(58) Field of Search ......................... 369/275.4, 275.5, 369/275.2, 275.1, 13.54, 13.55, 277, 278; 428/64.1, 64.2, 64.3, 64.4; 430/320, 321

(56) References Cited

U.S. PATENT DOCUMENTS

| | | | | |
|---|---|---|---|---|
| 6,097,695 A | * | 8/2000 | Kobayashi | 369/275.4 |
| 6,128,270 A | * | 10/2000 | Nishikawa | 369/275.4 |
| 6,335,916 B1 | * | 1/2002 | Endo et al. | 369/275.4 |
| 6,396,798 B1 | * | 5/2002 | Takemura et al. | 369/275.3 |

FOREIGN PATENT DOCUMENTS

| | | |
|---|---|---|
| EP | 0 664 541 | 7/1995 |
| EP | 0 867 870 | 9/1998 |
| EP | 0 973 155 | 1/2000 |
| EP | 0 978 830 | 2/2000 |

\* cited by examiner

*Primary Examiner*—Tan Dinh
(74) *Attorney, Agent, or Firm*—Oblon, Spivak, McClelland, Maier & Neustadt, P.C.

(57) ABSTRACT

An optical recording medium in which a high recording density is to be realized as compatibility with respect to a pre-existing optical recording medium is kept. A wobbling groove 5 is formed on a disc substrate 1. The modulation/demodulation system for the wobbling signals recorded on the wobbling groove 5 and that for information signals recorded and/or reproduced on or from the recording track are made to be the same as the modulation/demodulation system for a standardized pre-existing optical recording medium. Moreover, if the track pitch of kept recording track is Tp, the shortest recording mark period in recording on kept recording track is Mc, the wavelength of a light beam used in recording and/or reproducing kept recording track is λ, and the numerical aperture of the objective lens is NA, the following relation (1) to (3)

$$X=Tp/(\lambda/NA) \qquad (1)$$

$$Y=Mc/(\lambda/NA) \qquad (2)$$

$$Y>2.9118X^2-5.5422X+3.19 \qquad (3)$$

are met.

7 Claims, 5 Drawing Sheets

OPTICAL RECORDING MEDIUM AND MASTER DISC FOR PREPARATION THEREOF

BACKGROUND OF THE INVENTION

1. Field of the Invention

This invention relates to an optical recording medium in which recording and/or reproduction of information signals occurs in a direction along a recording track. This invention also relates to a master disc for producing such optical recording medium.

2. Description of Related Art

An optical recording medium is formed as a disc having a signal recording layer thereon. A light beam is illuminated on this signal recording layer to record and/or reproduce information signals.

Typical of this optical recording medium is a replay-only optical disc in which a row of pits corresponding to information signals to be recorded is pre-formed on a disc substrate, such as a CD (Compact Disc) or CD-ROM (CD-Read Only Memory). In such replay-only optical disc, the major surface of the disc substrate carrying the row of pits operates as a signal recording layer. In the CD, the mark length of each pit constituting the row of pits is a length of the information signals for recording which is normalized by a pre-set bit interval T. That is, the mark length of each pit of the row of pits is an integer number times the bit interval T, with the mark length of the shortest pit being e.g., three times the bit interval (3T).

For example, an optical disc used in a so-called Compact Disc recordable system to allow for post-writing of information signals is also being put to practical use. This optical disc is referred to below as CD-R. The CD-R has a signal recording layer for recording information signals formed of an organic dye-based material and, if irradiated with a light beam, has its reflectance changed at this illuminated location to effect recording. The signals recorded on the CD-R are reproduced by detecting the reflectance of the signal recording layer.

As an optical recording medium, a magneto-optical disc for recording and/or reproducing the information recording layer by exploiting photomagnetic effects, such as a Mini-Disc (MD), and a phase change type optical disc, which allows for rewriting recorded signals by exploiting phase changes of the signal recording layer, such as CD-RW, are also being put to practical application.

In e.g., a CD-R, among the above-mentioned various optical recording mediums, a wobbling groove is formed for extending along a recording track. This wobbling groove is a guide groove formed meandering at a pre-set period. By this meandering of the guide groove, the guide groove itself has signal components. Meanwhile, the guide groove is formed for extending along a recording track to provide for facilitated the tracking servo by e.g., the push-pull method.

In the CD-R, the sector information comprehending the frequency modulated (FM) absolute time information is recorded as signals by this wobbling groove. This sector information so recorded is referred to below as the wobbling signals. That is, in a Compact Disc Recordable System, employing the CD-R as a recording medium, a light beam is converged on the wobbling groove and the reflected light therefrom is detected to detect the wobbling signal having e.g., 22.5 kHz as a carrier wave. This wobbling signal is frequency demodulated to detect the absolute time information in recording and/or reproduction. The system in which the absolute time information is recorded as the wobbling signal is generally termed ATIP (Absolute Time In Pre-groove). There is also a system, termed ADIP (Address in Pre-groove) system, in which the address information is recorded as wobbling signals.

In the CD-R, the information signals, modulated in EFM (8 to 14 modulation) with respect to the recording track, are recorded and/or reproduced, based on the wobbling signals, as these wobbling signals are read out.

In the system in which the sector information inclusive of the absolute time information or the address information is recorded as the wobbling signals, the information signals can be continuously recorded and/or reproduced, in a manner advantageous in maintaining compatibility with respect to an optical disc on which information signals are recorded continuously. In a system in which the sector information inclusive of the absolute time information or the address information is not recorded as the wobbling signals, but are recorded e.g., at the leading end of each sector, the absolute time information or the address information and the information signals for recording are time-divisionally recorded, with the result that the information signals for recording are not continuous signals. This renders it difficult to maintain compatibility with respect to an optical disc on which information signals are recorded continuously, such as CD.

The optical disc in which the wobbling signals are recorded in a pre-groove formed along the recording track may be exemplified by, for example, an MD or a CD-RW, in addition to the CD-R.

In the above-described optical disc, it is strongly desired to increase the recording density to permit more and more information signals to be recorded for the same outer size of the disc as the standardized pre-existing optical disc. As the optical disc with a higher recording density than a conventional optical disc such as a conventional CD or CD-ROM, there have so far been proposed a DVD-R, DVD-RW or DVD+RW.

However, in the DVD-R, DVD-RW or DVD+RW, in distinction from the above-mentioned routine optical discs, exemplified by the CD or CD-ROM, recording signals are recorded not by the EFM modulation but by the EFM+ modulation (8 to 16 modulation). The wobbling signals also are not frequency modulated signals, with the modulation frequency of 22.05 kHz, as in the case of the above-mentioned pre-existing optical disc. In the DVD-R or DVD-RW, wobbling signals of the sine waveform of a sole wavelength are used, whereas, in the DVD+RW, pulse modulated wobbling signals are used.

Therefore, if, in a recording and/or reproducing apparatus for recording and/or reproducing information signals on or from the DVD-R or DVD-RW, it is desired to achieve compatibility with respect to the pre-existing CD or CD-ROM, it is necessary to provide modem circuitry for information signals and wobbling signals separately with the result that the system structure is complex and expensive.

Moreover, if, in an optical disc provided with a row of pits corresponding to information signals and which is used for replay only, such as CD or CD-ROM, the row of pits is formed to a high density to achieve high density recording and large recording capacity, and the optical disc is reproduced using a conventional recording and/or reproducing apparatus, there is raised a problem of increased jitter and lowered C/N ratio to render the stable replay operation difficult.

SUMMARY OF THE INVENTION

It is therefore an object of the present invention to provide an optical recording medium whereby a high recording density is achieved and recording and/or reproduction can be carried out reliably in stability as compatibility with standardized pre-existing optical recording mediums is kept.

It is another object of the present invention to provide a master disc for the preparation of this sort of the optical recording medium.

In one aspect, the present invention provides an optical recording medium in which information signals are recorded and/or reproduced along a recording track, wherein the recording density is made to be higher than that in a standardized pre-existing optical recording medium despite the fact that the modulation/demodulation system for information signals recorded and/or reproduced on or from the recording track is made to be the same as that for the standardized pre-existing optical recording medium, and wherein, if the track pitch of the recording track is Tp, the shortest recording mark period in recording on the recording track is Mc, the wavelength of a light beam used in recording and/or reproducing the recording track is λ, and the numerical aperture of the objective lens is NA, the following relation (1) to (3)

$$X = Tp/(\lambda/NA) \tag{9}$$

$$Y = Mc/(\lambda/NA) \tag{10}$$

$$Y > 2.9118X^2 - 5.5422X + 3.19 \tag{11}$$

is met.

With the optical recording medium according to the present invention, high recording density can be achieved as the combination of the track pitch Tp and the shortest recording mark period Mc is varied from that in the standardized pre-existing optical recording medium. Moreover, recording and/or reproduction can be realized reliably in stability as the combination of the track pitch and the shortest recording mark period of the standardized pre-existing optical recording medium is varied from that of the standardized pre-existing optical recording medium. In addition, recording and/or reproduction can be realized reliably in stability even in case a recording and/or reproducing apparatus adapted for recording and/or reproducing a standardized pre-existing optical recording medium is used for recording and/or reproduction.

In another aspect, the present invention provides a master disc for preparation of an optical recording medium employed in the preparation of an optical recording medium in which information signals are recorded and/or reproduced along a recording track. In the optical recording medium, the recording density of the optical recording medium is made to be higher than that in a standardized pre-existing optical recording medium despite the fact that the modulation/demodulation system for information signals recorded and/or reproduced on or from the recording track is made to be the same as that for the standardized pre-existing optical recording medium. If the track pitch of the recording track is Tp, the shortest recording mark period in recording on the recording track is Mc, the wavelength of a light beam used in recording and/or reproducing the recording track is λ, and the numerical aperture of the objective lens is NA, the following relation (1) to (3)

$$X = Tp/(\lambda/NA) \tag{12}$$

$$Y = Mc/(\lambda/NA) \tag{13}$$

$$Y > 2.9118X^2 - 5.5422X + 3.19 \tag{14}$$

is met.

In the master disc for an optical recording medium, constructed as described above, such an optical recording medium can be produced in which high recording density can be achieved as the combination of the track pitch Tp and the shortest recording mark period Mc is varied from that in the standardized pre-existing optical recording medium. Moreover, in the optical recording medium produced by the present master disc, recording and/or reproduction can be realized reliably in stability as the combination of the track pitch and the shortest recording mark period of the standardized pre-existing optical recording medium is varied from that of the standardized pre-existing optical recording medium. In addition, in the optical recording medium produced by the present master disc, recording and/or reproduction can be realized reliably in stability even in case recording and/or reproduction is performed by a recording and/or reproducing apparatus adapted for recording and/or reproducing a standardized pre-existing optical recording medium.

In the optical recording medium according to the present invention, recording and/or reproduction can be achieved reliably in stability even if a recording and/or reproducing apparatus for performing recording and/or reproduction on or from a standardized optical recording medium is used for recording and/or reproduction, while high recording density can be achieved. So, a high recording density and an increased recording capacity can be achieved as compatibility with respect to the standardized pre-existing optical recording medium is kept. Moreover, since the modulation/demodulation system for information signals and the wobbling signals can be used in common, the production cost of the recording and/or reproducing apparatus can be suppressed even when the optical recording medium of the present invention is used in conjunction with a recording and/or reproducing apparatus configured for reproducing the standardized pre-existing optical recording medium.

With the master disc for the optical recording medium according to the present invention, such an optical recording medium can be produced in which recording and/or reproduction may be achieved reliably in stability, even if a recording and/or reproducing apparatus for recording and/or reproducing a standardized pre-existing optical recording medium is used for recording and/or reproduction, whilst a high recording density can be realized. Thus, if an optical recording medium is produced using the master disc according to the present invention, such an optical recording medium can be produced in which a high recording density and an increased recording capacity can be achieved as compatibility with respect to the standardized pre-existing optical recording medium is kept.

DESCRIPTION OF THE PREFERRED EMBODIMENTS

Referring to the drawings, a preferred embodiment of the present invention will be explained in detail. In the following, such an embodiment is explained in which the present invention is applied to a CD-R in which recording and/or reproduction occurs along a wobbling groove formed in a signal recording layer of an organic dyestuff based recording material for carrying wobbling signals.

It is noted that the present invention is not limited to the CD-R, which will be explained hereinbelow. For example, the present invention may extensively be applied to a replay-only optical disc, on which a row of pits corresponding to information signals is preformed along a recording track, a write-once optical disc, in which the signal recording layer is formed of an organic dye-based material, a magneto-optical disc for recording and/or reproducing a signal recording layer by exploiting the photomagnetic effect, or to a phase-change optical disc in which recording signals can be re-written by exploiting phase transitions of the signal recording layer.

Figure 1:
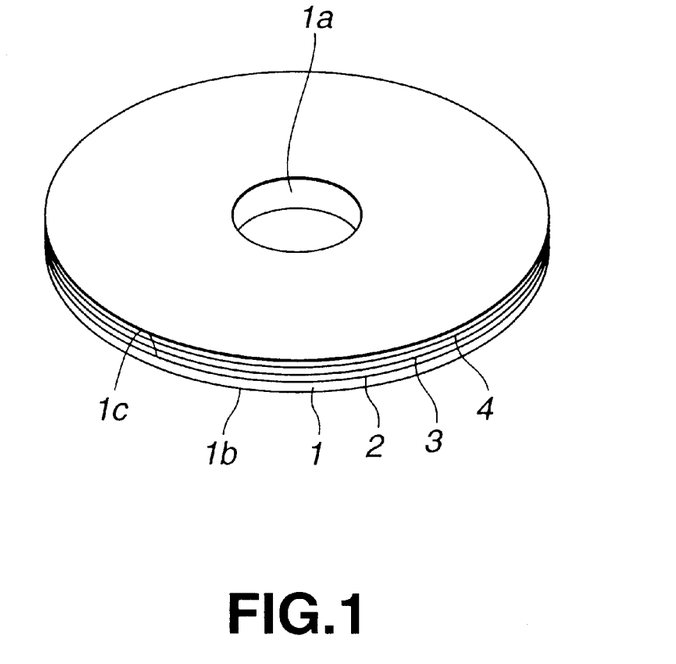
FIG. 1 is a schematic perspective view showing a CD-R as an illustrative structure of an optical recording medium embodying the present invention.
Figure 2:
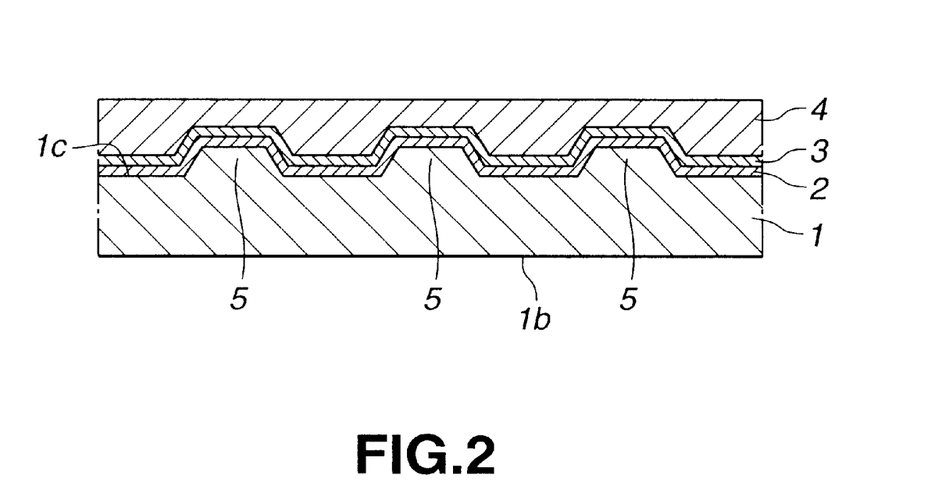
FIG. 2 is a schematic enlarged cross-sectional view showing a layered structure of the CD-R.

Referring to FIGS. 1 and 2, the CD-R according to the present invention includes a disc substrate 1, molded to substantially a disc shape from a resin material, such as polymethyl methacrylate (PMMA) or polycarbonate (PC). On the disc substrate 1, there are sequentially formed a signal recording layer 2, as a thin film of an organic dyestuff based material, a light reflecting layer 3, formed of Au, Ag or Al, and a protective layer 4 formed by spin-coating e.g., a UV light curable resin. FIGS. 1 and 2 are a schematic perspective view showing a CD-R and a schematic enlarged cross-sectional view of a layered structure of the CD-R, respectively.

A center opening 1a is bored in the disc substrate 1. When recorded and/or reproduced by a recording and/or reproducing apparatus, the CD-R is fixedly supported by a rotational driving unit of the recording and/or reproducing apparatus in the vicinity of the center opening 1a so as to be rotationally driving at a pre-set velocity. The disc substrate 1 transmits a light beam routinely used for recording and/or reproduction. The light beam is incident from a major surface 1b opposite to its major surface 1c carrying the respective layers of the disc substrate 1 to record and/or reproduce the signal recording layer 2.

On the major surface 1c of the disc substrate 1 carrying the respective layers is formed a wobbling groove 5 operating as a guide groove. A portion of the CD-R associated with this wobbling groove 5 is used as a recording track on which to record EFM modulated information signals (EFM signals).

That is, in the CD-R, a light beam is illuminated along a recording track on the signal recording layer 2. Recording marks corresponding to information signals to be recorded are formed on the signal recording layer 2 for recording. For reproduction, the presence or absence of the recording marks formed on the signal recording layer 2 is detected based on the difference in the intensity of the reflected light.

The wobbling groove 5 is formed spirally or concentrically on the major surface 1c of the disc substrate 1 at a pre-set period. In the CD-R, information signals are recorded and/or reproduced based on the wobbling signals recorded as the wobbling of the wobbling groove 5. In the CD-R of the present invention, the FM-modulated sector information, containing the absolute time information, that is ATIP wobbling signals, are recorded in the wobbling groove 5.

A specified method for recording and/or reproducing information signals, on or from the above-described CD-R, based on the wobbling signals, is hereinafter explained.

Figure 3:
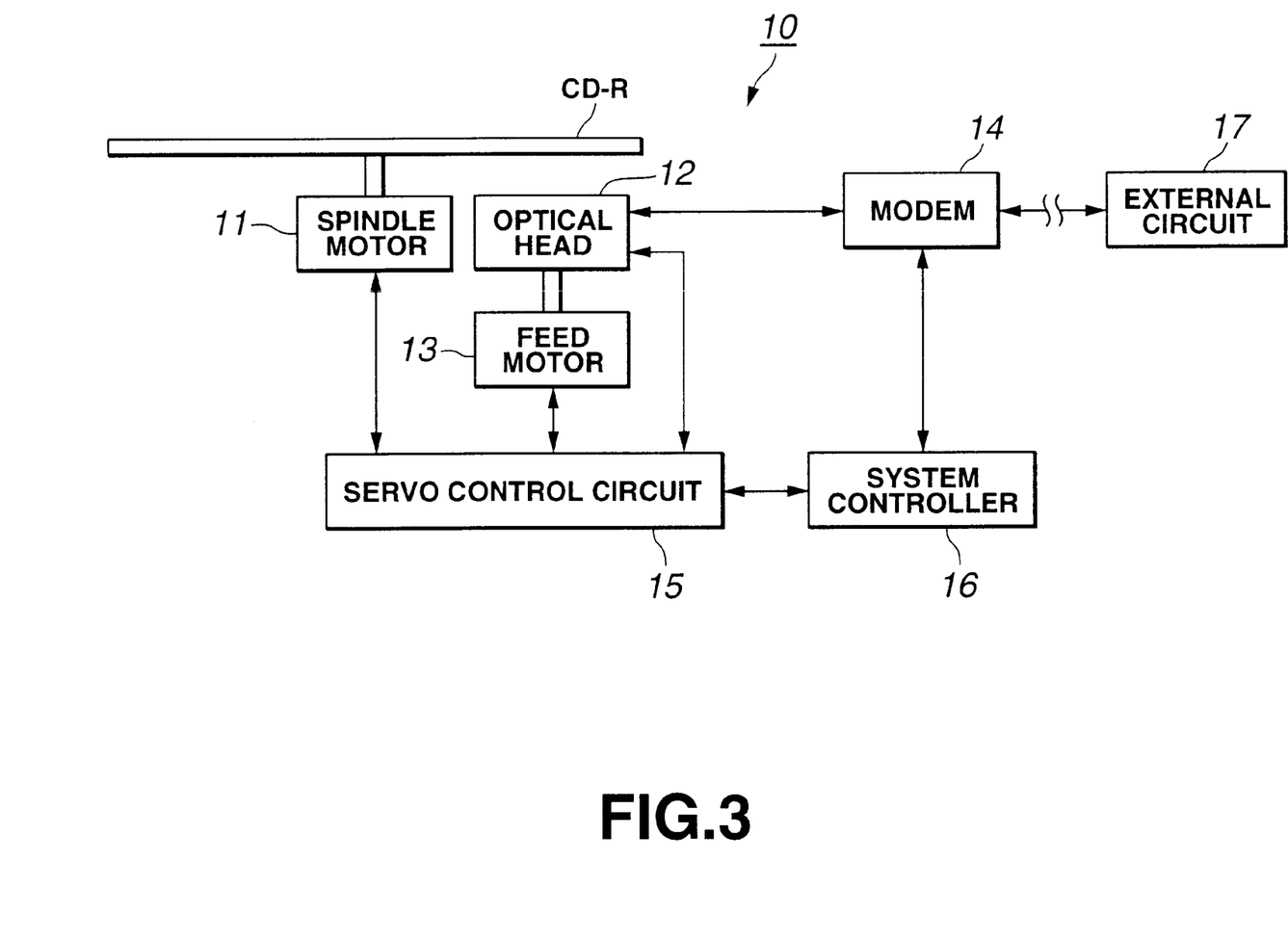
FIG. 3 is a schematic view showing the structure of a recording and/or reproducing apparatus for recording and/or reproducing the CD-R.

In recording and/or reproducing the CD-R, a recording and/or reproducing apparatus 10 shown for example in FIG. 3 is used. The recording and/or reproducing apparatus 10, used for recording and/or reproducing information signals on or from the CD-R, includes a spindle motor 11 for rotationally driving the CD-R, an optical head 12, a feed motor 13 for driving the optical head 12, a modem circuit 14 for performing pre-set modulation/demodulation processing, a servo circuit 15 for servo controlling the optical head 11, and a system controller 16 for controlling the apparatus in its entirety.

The spindle motor 11 is driven under control by the servo circuit 15, and is run in rotation at a pre-set rpm. That is, the CD-R to be reproduced is chucked to the spindle motor 11, driven under control by the servo control circuit 15, and is thereby run in rotation at a pre-set rpm.

The optical head 12 is driven by a feed motor 13 so as to be movable along the radius of the CD-R. In recording and/or reproducing information signals on or from the CD-R, a light beam is illuminated by the optical head 12 along a recording track on the signal recording layer 2 of the CD-R. For recording, a light beam is illuminated at a pre-set power on the signal recording layer 2 to form a recording mark in keeping with signals for recording. During reproduction, a light beam is illuminated on the signal recording layer 2 at a power smaller than that for recording to detect the reflected light volume varied responsive to the presence or absence of the recording mark from the return light beam reflected back from the signal recording layer 2 and the light reflecting layer 3.

The recording and/or reproducing signal by the optical head 12 is modulated or demodulated by the modem 14, and is input to or output from an external circuit 17 via this modem 14. In recording information signals on the CD-R, the recording and/or reproducing apparatus 10 EFM (8 to 14) modulates the information signals by the modem 14. The EFM-modulated signal (EFM signal) is recorded by the optical head 12 on the signal recording layer 2. In reproducing the information signals recorded on the CD-R, the signals detected by the CD-R are EFM-demodulated by the modem 14 and output as information signals to the external circuit 17.

In recording and/or reproducing the CDR, the recording and/or reproducing apparatus 10 illuminates a light beam on the wobbling groove 5 by the optical head 12 to detect the reflected light to detect the wobbling signals recorded on the wobbling groove 5. The wobbling signals are modulated by the modem 14 for expansion to the sector information comprehending the absolute time information. The recording and/or reproducing apparatus 10 performs recording and/or reproduction by the optical head 12 based on this absolute time information. Specifically, the absolute time information output by the modem 14 is fed to the servo control circuit 15 through a system controller 16, and the feed motor 13 is driven under control by the servo control circuit 15 to adjust the position of the light beam illuminated by the optical head 12.

The servo control circuit 15 is also connected to the optical head 12 so that tracking servo or focussing servo is carried out based on signals corresponding to the return light detected by the optical head 12.

Meanwhile, in the CD-R, according to the present invention, the modulation/demodulation system for information signals recorded and/or reproduced on or from the recording track formed by the wobbling groove 5 is the EFM modulation system, whilst the signals recorded on the wobbling groove 5 is the ATIP wobbling signals. That is, in the CD-R according to the present invention, the modulation/demodulation system for information signals recorded and/or reproduced on or from the recording track and the modulation/demodulation system for the wobbling signals are the same as those for the routine CD-R or CD.

In the CD-R according to the present invention, the track pitch of the recording track, formed along the wobbling groove 5, and the shortest recording mark period, recorded on the recording track, are set as hereinafter explained.

That is, if the track pitch of the recording track is Tp, the shortest recording mark period is Mc, the wavelength of the light beam used in recording and/or reproducing the recording track is λ and the numerical aperture of an objective lens is NA, the track pitch Tp of the recording track and the shortest recording mark period Mc are set for satisfying the relation indicated by the following equations 15, 16 and inequality 17:

$$X = Tp/(\lambda/NA) \quad (15)$$

$$Y = Mc/(\lambda/NA) \quad (16)$$

$$Y > 2.9118X^2 - 5.5422X + 3.19 \quad (17)$$

Specifically, the track pitch of the recording track and the shortest recording mark period in the routine CD-R or CD are set to 1.60 μm and to 1.67 μm, respectively. The wavelength of the light beam used for recording and/or reproduction and the numerical aperture of the objective lens are set to 780 nm and 0.45, respectively.

On the other hand, in the CD-R of the present invention, the track pitch Tp of the recording track and the shortest recording mark period Mc are set to 1.05 μm and to 0.97 μm, respectively, whilst the wavelength of the light beam used for recording and/or reproduction and the numerical aperture of the objective lens are set to 780 nm and to 0.55, respectively. That is, the CD-R embodying the present invention is set to satisfy the relation shown in the above equations and inequality 15 to 17.

The shortest recording mark period is now explained. In the optical recording medium, such as CD-R, recording marks are formed in the signal recording layer depending on the information signals for recording. The length of the recording mark is a length of a target signal for recording on the signal recording layer 2 normalized by a pre-set bit interval T. That is, the recording mark length is the length of the recording mark of the bit row formed on the recording track, and is an integer number times the bit interval T. In the present embodiment, the present invention is applied to a CD-R compatible with the conventional CD-R or CD. In the conventional CD-R or CD, the shortest recording mark is thrice the bit interval. So, the shortest recording mark length is thrice the bit interval T (μm), whereby it is possible to represent 3 bits. The shortest recording mark period is a period in case such shortest recording marks are formed in succession on the signal recording layer. In the present embodiment, the shortest recording mark period is a length 3T of the recording mark forming portion plus a length 3T of the recording mark non-forming portion, or 6T.

The recording mark may be a so-called pit on the crest and groove shape in the signal recording layer in a replay-only optical recording medium, such as CD or CD-ROM, or a recording mark formed on the signal recording layer in the phase change optical recording medium used as a write-once disc, such as CD-R. The recording mark may also be a recording mark formed on the signal recording layer in the magneto-optical disc used as an overwritable recording medium.

The present invention is not limited to an optical recording medium carrying the wobbling groove 5 representing recorded wobbling signals, but may also be applied to a replay-only optical disc on which rows of pits corresponding to information signals are pre-recorded along the recording track, as in the case of the conventional CD or CD-ROM. The present invention may also be applied to this case in which, by application of the present invention, a high density recording may be realized, as compatibility with the conventional CD or CD-ROM is kept, thereby assuring reliable reproducing operation in stability.

The meaning of the relation indicated by the above equations 15 to 17 is hereinafter explained.

It is felt in general to be crucial to diminish the spot area on the signal recording layer of the light beam in order to realize a high recording density in an optical recording medium configured for recording and/or reproducing information signals by illuminating a light beam on the signal recording layer. The spot area of the light beam can be diminished by increasing the numerical aperture of the objective lens in the recording and/or reproducing apparatus or by shortening the wavelength of the light beam used for recording and/or reproduction.

Specifically, the CD-ROM, extensively used as one of the standardized optical recording mediums, has a recording capacity on the order of 650 MB. In this CD-ROM, the numerical aperture of the objective lens used for recording and/or reproduction is 0.45. So, by performing recording and/or reproduction using an objective lens with the numerical aperture of 0.55, the spot area of the light beam is $(0.45/0.55)^2 = 0.67$, that is, it is decreased by a factor of 0.67. Thus, it is possible to reduce the recording mark used for recording and/or reproduction by the light beam to render it possible to record more signals for the same area to improve the recording capacity by a factor of 1/0.67=1.49.

However, with the above-described method for achieving high recording density by decreasing the spot area of the light beam, it is necessary to vary the numerical aperture of the objective lens or the wavelength of the light beam, so that it is also necessary to improve the optical system on the recording and/or reproducing apparatus side, while it is extremely difficult to assure compatibility with respect to the conventional optical recording medium not configured for high density recording. On the other hand, since there is a limitation to the numerical aperture of the objective lens or the wavelength of the light beam that may be used for recording and/or reproducing the optical recording medium, there is a limit to the high density recording which relies solely on the improvement in the optical system in the recording and/or reproducing apparatus.

As a result of our patient researches, the present inventors have found that, by varying the combination of the track pitch of the recording track and the linear recording density, it is possible to realize high recording density without the necessity of improving the optical system in the recording and/or reproducing apparatus. That is, by decreasing the track pitch and the line recording density so as to be narrower than those in the conventional optical recording medium, more information signals can be recorded in the same area of the recording region. However, if the track pitch and the line recording density are reduced excessively, increase in jitter or lowering of the C/N ratio occurs in case the conventional recording and/or reproducing apparatus is used for recording and/or reproduction, with the result that compatibility with respect to the conventional optical recording medium cannot be kept.

In a standardized pre-existing optical recording medium, such as CD or CD-ROM, it is in general a requirement that the C/N ratio be not less than 47 dB and the jitter be not higher than 15%. If this range is exceeded, there is a risk that regular reproduction operation becomes impossible. So, the present inventors investigated into various factors influencing the C/N or the jitter, and prepared CD-R samples shown in Table 1 for investigations, as the combination of the track pitch and the line recording density were varied so that the C/N not less than 47 dB and the jitter of 15% could be realized even in a conventional recording and/or reproducing apparatus. In the following Table 1, the values of the track pitch and the line recording density in the conventional CD-ROM are also shown for comparison sake. 48.

TABLE 1

|  | track pitch Tp (μm) | X Tp/ (λ/NA) | shortest recording mark period Mc (μm) | Y Mc/ (λ/NA) | recording capacity (GB) | multiplication factor of recording capacity |
|---|---|---|---|---|---|---|
| Ex. 1 | 1.05 | 0.74 | 0.97 | 0.68 | 1.71 | 2.62 |
| Ex. 2 | 1.10 | 0.78 | 0.91 | 0.64 | 1.73 | 2.66 |
| Ex. 3 | 1.20 | 0.85 | 0.83 | 0.58 | 1.74 | 2.66 |
| Ex. 4 | 1.60 | 1.13 | 0.91 | 0.64 | 1.19 | 1.83 |
| CD-ROM | 1.60 | 0.92 | 1.67 | 0.96 | 0.65 | 1.00 |

Meanwhile, in the CD-R, prepared as shown in Table 1, the wavelength λ of the light beam used for recording and/or reproduction was set to 780 nm, with the numerical aperture NA of the objective lens being 0.55. As the line recording density, the above-mentioned shortest recording mark period was used.

In Table 1, the track pitch and the shortest recording mark period are normalized with λ/NA, that is (wavelength of light beam)/(numerical aperture of the objective lens), proportionate to the spot diameter, in order to cancel the effect of the spot diameter on the light beam used for recording and/or reproduction. Table 1 also shows these normalized values of the track pitch and the shortest recording mark period, that is X and Y, as calculated from the above equations 15 and 16.

It may be seen from the results shown in Table 1 that, by selecting the track pitch and the shortest recording mark period, the high recording density and improvement in the recording capacity can be achieved as compatibility with the conventional CD-R or CD is kept. So, the normalized track pitch X and shortest recording mark period Y, in the case shown in Table 1, are made into a quadratic curve, whereby the aforementioned inequality 17 was obtained.

That is, if the inequality 17 is met, a sufficient C/N value and the jitter not higher than 15% can be realized even with the conventional recording and/or reproducing apparatus, so that sufficient compatibility with respect to the conventional CD or CD-R can be realized to provide for stabilized reliable recording and/or reproduction. Moreover, the track pitch and the shortest recording mark period can be reduced to realize a high recording density and a large capacity.

Meanwhile, the inequality 17 indicates the relation between the normalized track pitch X and the shortest recording mark period Y. Therefore, the relation indicated by the inequality 17 is not dependent on the wavelength λ of the light beam used in recording and/or reproduction or on the numerical aperture NA of the objective lens. Thus, the present invention is not limited to the application to an optical recording medium compatible with the conventional CD or CD-R, but may be applied to a variety of optical recording mediums depending on the wavelength λ of the light beam for recording and/or reproduction or the value of the numerical value NA of the objective lens. That is, on the condition that the track pitch Tp and the shortest recording mark period Mc are selected depending on the wavelength λ of the light beam used for recording and/or reproduction and the numerical aperture NA of the objective lens, and compatibility with respect to the various standardized pre-existing optical recording mediums is kept, there may be realized an optical recording medium having a recording density higher than that of this pre-existing optical recording medium and which can be recorded and/or reproduced reliably and in stability.

Meanwhile, if the numerical aperture of the objective lens or the wavelength of the light beam is changed to improve the optical system, without applying the present invention, and only the track pitch and the shortest recording mark period are made equal to those in the conventional CD or CD-R in an attempt to realize the high recording density, the relation shown by the following inequality 18

$$Y \geq 0.8899 X^{-1} \tag{18}$$

represents a limit.

That is, if, in the present case, the thickness of the disc substrate is set to 1.2 mm, in consideration of compatibility with respect to the conventional CD or CD-ROM, the numerical aperture NA of the objective lens on the order of 0.55 is a limit in view of the focal length, focussing margin and the disc substrate skew. As for the wavelength λ of the light beam which provides for recording and/or reproduction to or from the signal recording layer, the value on the order of 650 nm is a limit. From this, the relation shown by the inequality 18 is derived.

However, with the optical recording medium according to the present invention, the track pitch and the shortest recording mark period can be selected to satisfy the relation shown by the inequality 17 to realize stable and reliable recording and/or reproduction, beyond the limit of the high recording density, as compatibility is kept. That is, the relation shown by the following inequality 19:

$$Y < 0.8899 X^{-1} \tag{19}$$

may be met.

On the other hand, in an optical recording medium for recording and/or reproduction employing a light beam, there is a cut-off frequency corresponding to the limit resolution which can be reliably read out by the optical system of the recording and/or reproducing apparatus. The cut-off frequency is a theoretical lower limit value of the spatial frequency beyond which signal reproduction is impossible, and may be represented by the following equation 20:

$$\text{cut-off frequency} = 2 \times NA / \lambda \tag{20}$$

where the spatial frequency of the track pitch is represented by the following equation 21:

$$\text{spatial frequency of track pitch} = 1/Tp \tag{21}$$

In an optical recording medium, the spatial frequency of the track pitch needs to be not higher than the cut-off frequency, in order to reliably discriminate the neighboring recording track by the light beam. Thus, in the optical recording medium according to the present invention, recording and/or reproduction can be carried out reliably as the neighboring recording track is reliably verified by the light beam, by satisfying the relation of the following relation 22, derived from the equations 20 and 21:

$$Tp/(\lambda/NA)=X>0.5 \qquad (22).$$

On the other hand, the line recording density, that is the spatial frequency of the shortest recording mark period, can be shown by the following equation 23:

$$\text{spatial frequency of the shortest recording mark period}=1/Mc \quad (23).$$

In the optical recording medium, in order to reliably verify the recording mark by the light beam, the spatial frequency of the shortest recording mark period needs to be equal to or less than the cut-off frequency. So, in the optical recording medium of the present invention, the neighboring shortest recording mark can be reliably verified by the light beam if the following relation 24:

$$Mc/(\lambda/NA)=Y>0.5 \qquad (24)$$

derived from the above equations 20 and 23 is met.

Meanwhile, since the equation 17 fully satisfies the equation 24, it is unnecessary, with the optical recording medium of the present invention, to take such precautions that the spatial frequency of the shortest recording mark period shall not be lower than the cut-off frequency.

In preparing the above-described CD-R, according to the present invention, a disc substrate 1 carrying the wobbling groove 5 is prepared, by injection molding employing a stamper as a master disc for preparing the CD-R, and the signal recording layer 2, light reflecting layer 3 and the protective layer 4 are sequentially formed on the disc substrate 1. In the following, a typical laser cutting apparatus 20 for preparing a stamper used for preparing the disc substrate 1 is hereinafter explained.

Figure 4:
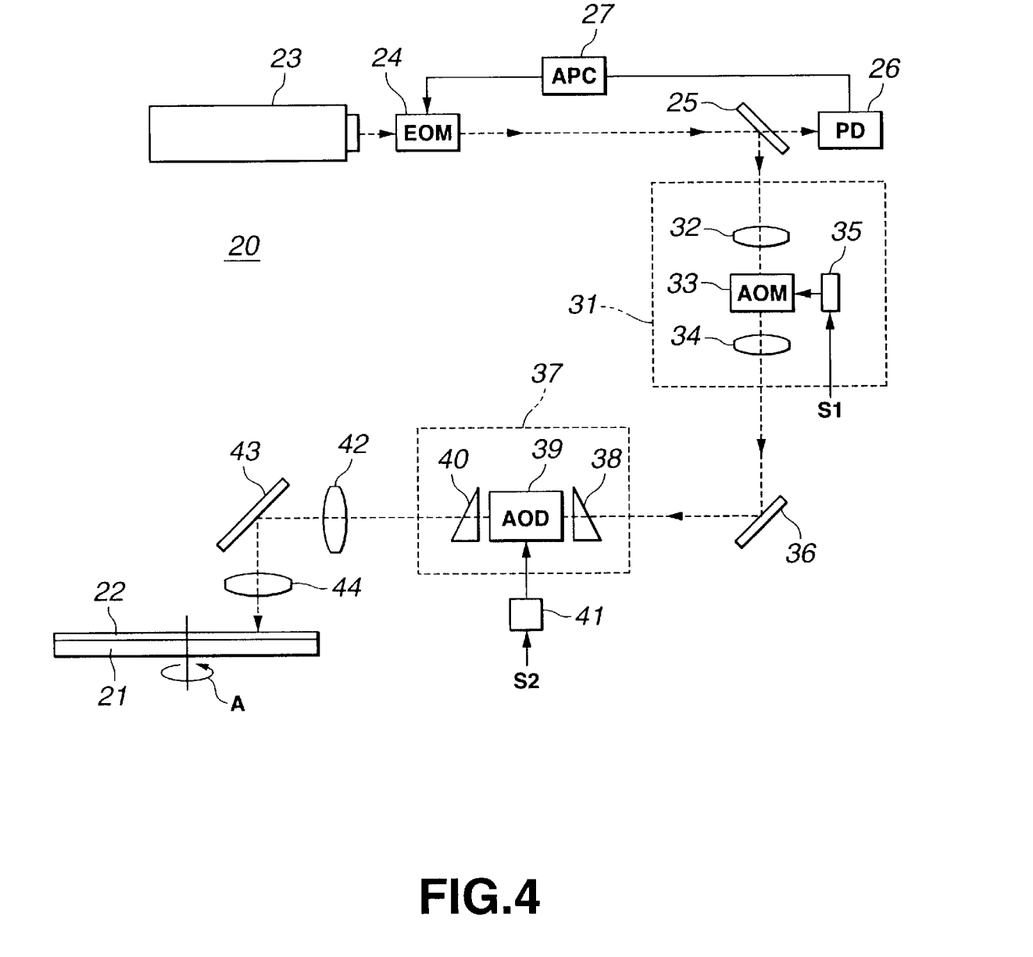
FIG. 4 is a schematic view showing the structure of a laser curring device for producing a stamper used for the preparation of the CD-R.

The laser cutting apparatus 20, shown in FIG. 4, is an apparatus for exposing a photoresist layer 22 coated on a glass substrate 21 to light to form a latent image. In forming a latent image on the photoresist layer 22 by this laser cutting apparatus 20, the glass substrate 21, coated with the photoresist layer 22, is mounted on a rotational driving device mounted on a movable optical table. When exposing the photoresist layer 22 to light, the glass substrate 21 is run in rotation by a rotational driving device as indicated by arrow A, while being radially translated by the movable optical table, in order that the entire surface of the photoresist layer 22 will be exposed to light with a pattern corresponding to a spirally or concentrically extending crest and groove pattern of the wobbling groove 5 formed on the disc substrate 1.

This laser cutting apparatus 20 includes a light source 23 for radiating the laser light, an electro-optical modulator (EOM) 24 for adjusting the intensity of the laser light radiated from the light source 23, and a beam splitter 25 for splitting the laser light radiated from the ROM 24. The laser cutting apparatus 20 also includes a photodetector (PD) 26 for detecting the laser light transmitted through the beam splitter 25, and an automatic power controller APC 27 for applying a signal electrical field to the EOM 24 to adjust the intensity of the laser light radiated from the EOM 24.

In the above-described laser cutting apparatus 20, the laser light radiated from the light source 23 is adjusted to a pre-set light intensity by the EOM 24 driven by the signal electrical field applied from the APC 27.

Although any suitable light source may be used as the light source 23, such a light source which radiates laser light of a shorter wavelength is preferred. Specifically, a Kr laser radiating the laser light of a wavelength λ of 413 nm or a He—Cd laser radiating the laser light of a wavelength λ of 442 nm is preferred.

The laser light radiated from the EOM 24 is split by the beam splitter 25 into the reflected light and the transmitted light. It is noted that the laser light reflected by the beam splitter 25 proves the light beam exposing the photoresist layer 22 to light.

The intensity of the laser light transmitted through the beam splitter 25 is detected by the photodetector 26 such that a signal corresponding to the detected intensity is routed from the photodetector 26 to the APC 27. The APC 27 is responsive to the signal routed from the photodetector 26 to adjust the signal electrical field applied to the photodetector 26 so that the light intensity detected by the photodetector 26 will be at a constant level. In this manner, automatic power control (APC) is performed such as to render the light intensity of the laser light radiated from the EOM 24 constant to assure stable laser light suffering only little noise.

The light beam reflected by the beam splitter 25 is routed to a modulation optical system 31 adapted for modulating the intensity of the exposure light beam by the modulation optical system 31.

The exposing light beam, incident on the modulation optical system 31, is collected by a light collecting lens 32 to be incident on an acoustic optical modulator (AOM) 33 whereby the light beam is intensity-modulated in keeping with a desired light exposure pattern. The exposure light beam, intensity-modulated by the EOM 33, is made into a parallel light beam by a collimator lens 34 so as to be radaited from the modulation optical system 31.

The AOM 33 is fitted with a driver 35 for driving the AOM 33. During light exposure of the photoresist layer 22, a signal S1 corresponding to the desired light exposure pattern is input to the driver 35. Responsive to the signal S1, the AOM 33 is driven by the driver 35 so as to be intensity-modulated with respect to the exposure light beam.

Specifically, when a latent image of a groove pattern that is in keeping with the grove of a pre-set depth is formed on the photoresist layer 22, a DC signal of a constant level is input to the driver 35, by means of which the AOM 33 is driven responsive to the DC signal. This intensity-modulates the exposure light beam in keeping with the desired groove pattern.

In this manner, the exposure light beam is intensity-modulated by the modulation optical system 31. The exposure light beam radiated from the modulation optical system 31 is reflected by a mirror 36 in a direction parallel to the movable optical table.

The exposure light beam, routed in a direction the movable optical table, is optically deflected by a deflecting optical system 37. It is noted that the deflecting optical system 37 is used for optically deflecting the exposure light beam. That is, if desired to form a latent image in keeping with the wobbling groove 5 formed in the disc substrate 1 of the CD-R embodying the present invention, the exposure light beam is optically polarized in keeping with the groove shape by the deflecting optical system 37. The photoresist layer 22 is exposed to light by the optically polarized exposure light beam.

That is, the exposure light beam, radiated from the modulation optical system 31 to fall on the deflecting optical system 37, is incident via a wedge prism 38 to an acousto-optical deflector (AOD) 39 whereby it is optically deflected in keeping with the desired light exposure pattern. The exposure light beam, optically deflected by the AOD 39, is radiated via wedge prism 40 from the deflection optical system 37.

The AOD 39 is fitted with a driver 41 for driving the AOD 39. During light exposure of the photoresist layer 22, a signal S2 corresponding to the desired light exposure pattern is input to the driver 41. The AOD 39 is driven by the driver 41, responsive to the signal S2 to optically deflect the light exposure beam.

The light exposure beam, thus optically deflected by the deflecting optical system 37, is increased in size by an enlarging lens 42 to a pre-set beam diameter so as to be then reflected by a mirror 43 towards an objective lens 44, by means of which the beam is collected on the photoresist layer 22. This exposes the photoresist layer 22 to light to form a latent image on the photoresist layer 22.

At this time, the glass substrate 21, coated with the photoresist layer 22, is run in rotation by a rotational driving device, as indicated by arrow A, so that the entire surface of the photoresist layer 22 will be exposed to light in accordance with a desired pattern, at the same time as the glass substrate 21 is translated by the movable optical table. As a result, a latent image corresponding to the illumination trajectory of the exposure light beam is formed on the entire surface of the photoresist layer 22.

The method for preparing the CD-R according to the present invention is explained with reference to a specified embodiment thereof. Although a specified embodiment of the method for preparing the CD-R is hereinafter explained, the present invention may be applied for preparation of a variety of optical discs, such as CD, CD-ROM or CD-RW, in addition to the CD-R.

In preparing the CD-R according to the present invention, a stamper having a crest-and-groove pattern corresponding to the wobbling groove 5 formed on the disc substrate 1 is prepared as a master disc process.

In this master disc process, a disc-shaped glass substrate, the surface of which has been ground, is rinsed and dried. Subsequently, a photoresist layer as a photosensitive material is applied to the glass substrate. The photoresist layer 22 then is exposed to light by the aforementioned laser cutting apparatus 20 to form a latent image which is in meeting with the wobbling groove 5 formed on the disc substrate 1 on the photoresist layer.

At this time, an exposure light beam is optically deflected, in keeping with the signals for recording, by the deflecting optical system 37 of the laser cutting apparatus 20. This forms a latent image, in keeping with the wobbling groove 5, which records signal by deflection along the track width, on the photoresist layer.

Meanwhile, if the photoresist layer is exposed to light to form a latent image corresponding to the wobbling groove 5, the glass substrate coated with the photoresist layer is run in rotation at a pre-set rpm, at the same time as it is translated at a pre-set speed in the radial direction. Specifically, the rpm and the movement speed along the radius of the glass substrate are adjusted to set the track pitch of the wobbling groove 5 so as to be equal to 1.05 $\mu$m.

After forming the latent image on the photoresist layer, the glass substrate is set on a turntable of a developing unit with the surface thereof coated with the photoresist layer facing upwards. As the glass substrate is run in rotation by rotating the turntable, a developing solution is applied dropwise onto the photoresist layer to form a crest-and-groove pattern corresponding to the wobbling groove 5 on the glass substrate.

An electrifying film, formed e.g., of Ni, is then formed on this crest-and-groove pattern by an electroless plating method. The glass substrate, now carrying the electrifying film, is mounted on an electro-casting device, and a plating layer of e.g., Ni is deposited to a thickness on the order of 300±5 $\mu$m on the electrifying film by an electro-plating method. The plating layer then is exfoliated and rinsed e.g., with acetone to remove the photoresist layer left on its surface having the crest-and-groove pattern transcribed thereon.

By the above process, a master disc for the preparation of an optical recording medium comprising a plating having transcribed thereon the crest-and-groove pattern formed on the glass substrate, that is a stamper carrying the crest-and-groove pattern corresponding to the wobbling groove 5, is completed.

Then, as a transcription process, the disc substrate 1, having transcribed thereon the surface shape of the stamper, is prepared by the photopolymer method (so-called photopolymer method).

Specifically, a photopolymer is smoothly coated on the stamper, carrying the crest-and-groove pattern, to form a photoresist layer. On this photoresist layer is tightly contacted a base plate so that no foam nor dust will be intruded into the photopolymer method. As the base plate, such a base plate composed of polymethyl methacrylate 1.2 mm in thickness is used.

The photopolymer then is cured on illumination of the UV light. The stamper then is exfoliated to complete the disc substrate 1 having the surface shape of the stamper transcribed thereon.

Here, an embodiment has been shown in the disc substrate 1 is fabricated, using the 2P method, so that the crest-and-groove pattern formed on the stamper will be correctly transcribed more accurately to the disc substrate 2. However, if desired to produced the disc substrates in large quantities, the disc substrate may, of course, be fabricated by injection molding using transparent resins, such as polymethacrylate or polycarbonate.

Then, as the film-forming process, the signal recording layer 2, light reflecting layer 3 and the protective layer 4 are formed on the disc substrate 1 having the surface shape of the stamper transcribed thereon. Specifically, the signal recording layer 2 is formed to a thin film shape from a material of an organic dyestuff base, on the surface of the disc substrate 1 carrying the crest-and-groove pattern. The light reflecting layer 3 of e.g., Al, is formed by vapor deposition, and a UV light curable resin is then applied on the light reflecting layer 3 by a spin coating method. The UV light curable resin is then irradiated with the UV light and cured to form the protective layer 4.

The above-described process completes the CD-R embodying the present invention. That is, the CD-R embodying the present invention can be fabricated by employing the stamper, carrying the crest-and-groove pattern corresponding to the wobbling groove 5 formed on the CD-R embodying the present invention.

EXAMPLES

In the following, practical preparation o a CD-R according to the present invention is explained. Meanwhile, in the following Examples, a CD-R was fabricated as the combination of the track pitch Tp and the shortest recording mark period Mc is selected on the assumption that the recording and/or reproduction is performed by illuminating a light beam with a wavelength of 780 nm using an objective lens with the NA of 0.55.

Example 1

First, CD-R samples were prepared as described above, in accordance with the present invention, as the combination of the track pitch Tp and the shortest recording mark period Mc were varied such as to meet the above inequality 17. These CD-R samples are termed samples 1 to 8.

Example 2

Several CD-R samples were prepared, as the combination of the track pitch Tp and the shortest recording mark period Mc were varied as in Example 1 described above. These CD-R samples are termed samples 9 to 13. Meanwhile, in the CD-R samples, prepared in this Example 2, the combination of the track pitch Tp and the shortest recording mark period Mc was selected so that its recording capacity is equal to 1.49 times the recording capacity of a conventional CD (approximately 0.65 GB), that is 0.97 GB. In the present Example 2, in which the combination of the track pitch Tp and the shortest recording mark period Mc is selected so as to give a recording capacity 1.49 times that of the conventional CD, the recording capacity is such as can be achieved solely by the improvement of the optical system, as when the numerical aperture of the objective lens is changed to 0.55 from 0.45 used in the conventional CD.

Example 3

Several CD-R samples were then prepared as described above, as the combination of the track pitch Tp and the shortest recording mark period Mc was selected so as not to meet the above inequality 17. These CD-R samples are termed samples 14 to 17.

For the CD-R samples 1 to 17, prepared as the combination of the track pitch Tp and the shortest recording mark period Mc was varied, the values of the recording capacity were measured in case of recording information signals using a light beam with a wavelength $\lambda$ of 780 nm and an objective lens with the numerical aperture NA of 0.55. Similarly, replay was made using a light beam with a wavelength $\lambda$ of 780 nm and an objective lens with the numerical aperture NA of 0.55, and the jitter produced at this time was measured.

The results are shown in the following Table 2, in which, for comparison, the corresponding values of the CD-ROM are also shown. Meanwhile, in the conventional CD-ROM, recording and/or reproduction was performed using a light beam with a wavelength $\lambda$ of 780 nm and an objective lens with the numerical aperture NA of 0.45.

TABLE 2

| | | $\lambda$/NA ($\mu$m) | track pitch Tp ($\mu$m) | X Tp($\lambda$/NA) | ratio of Tp to CD-ROM | shortest recording mark period Mc ($\mu$m) | Y Mc($\lambda$/NA) | ratio of Mc to CD-ROM | recording capacity GB | jitter |
|---|---|---|---|---|---|---|---|---|---|---|
| First Example | sample 1 | 1.42 | 1.05 | 0.74 | 0.66 | 0.97 | 0.68 | 0.58 | 1.71 | 15% |
| | sample 2 | 1.42 | 1.10 | 0.78 | 0.69 | 0.91 | 0.64 | 0.55 | 1.73 | 15% |
| | sample 3 | 1.42 | 1.20 | 0.85 | 0.75 | 0.83 | 0.58 | 0.50 | 1.74 | 15% |
| | sample 4 | 1.42 | 1.60 | 1.13 | 1.00 | 0.91 | 0.64 | 0.55 | 1.19 | 15% |
| | sample 5 | 1.42 | 1.05 | 0.74 | 0.66 | 1.13 | 0.80 | 0.68 | 1.46 | 10% |
| | sample 6 | 1.42 | 1.10 | 0.78 | 0.69 | 1.05 | 0.74 | 0.63 | 1.50 | 10% |
| | sample 7 | 1.42 | 1.20 | 0.85 | 0.75 | 0.97 | 0.68 | 0.58 | 1.49 | 10% |
| | sample 8 | 1.42 | 1.60 | 1.13 | 1.00 | 1.02 | 0.72 | 0.61 | 1.06 | 10% |
| Second Example | sample 9 | 1.42 | 1.60 | 1.13 | 1.00 | 1.12 | 0.79 | 0.67 | 0.97 | — |
| | sample 10 | 1.42 | 1.50 | 1.06 | 0.94 | 1.19 | 0.84 | 0.72 | 0.97 | — |
| | sample 11 | 1.42 | 1.40 | 0.99 | 0.88 | 1.28 | 0.90 | 0.77 | 0.97 | — |
| | sample 12 | 1.42 | 1.30 | 0.92 | 0.81 | 1.38 | 0.97 | 0.83 | 0.97 | — |
| | sample 13 | 1.42 | 1.20 | 0.85 | 0.75 | 1.49 | 1.05 | 0.89 | 0.97 | — |
| Comp. Ex. | sample 14 | 1.42 | 1.05 | 0.74 | 0.66 | 0.89 | 0.63 | 0.53 | 1.86 | 17% |
| | sample 15 | 1.42 | 1.10 | 0.78 | 0.69 | 0.85 | 0.60 | 0.51 | 1.86 | 17% |
| | sample 16 | 1.42 | 1.20 | 0.85 | 0.75 | 0.74 | 0.52 | 0.44 | 1.96 | 17% |
| | sample 17 | 1.42 | 1.60 | 1.13 | 1.00 | 0.86 | 0.61 | 0.52 | 1.26 | 17% |
| CD-ROM | | 1.73 | 1.60 | 0.92 | 1.00 | 1.67 | 0.96 | 1.00 | 0.85 | — |

Figure 5:
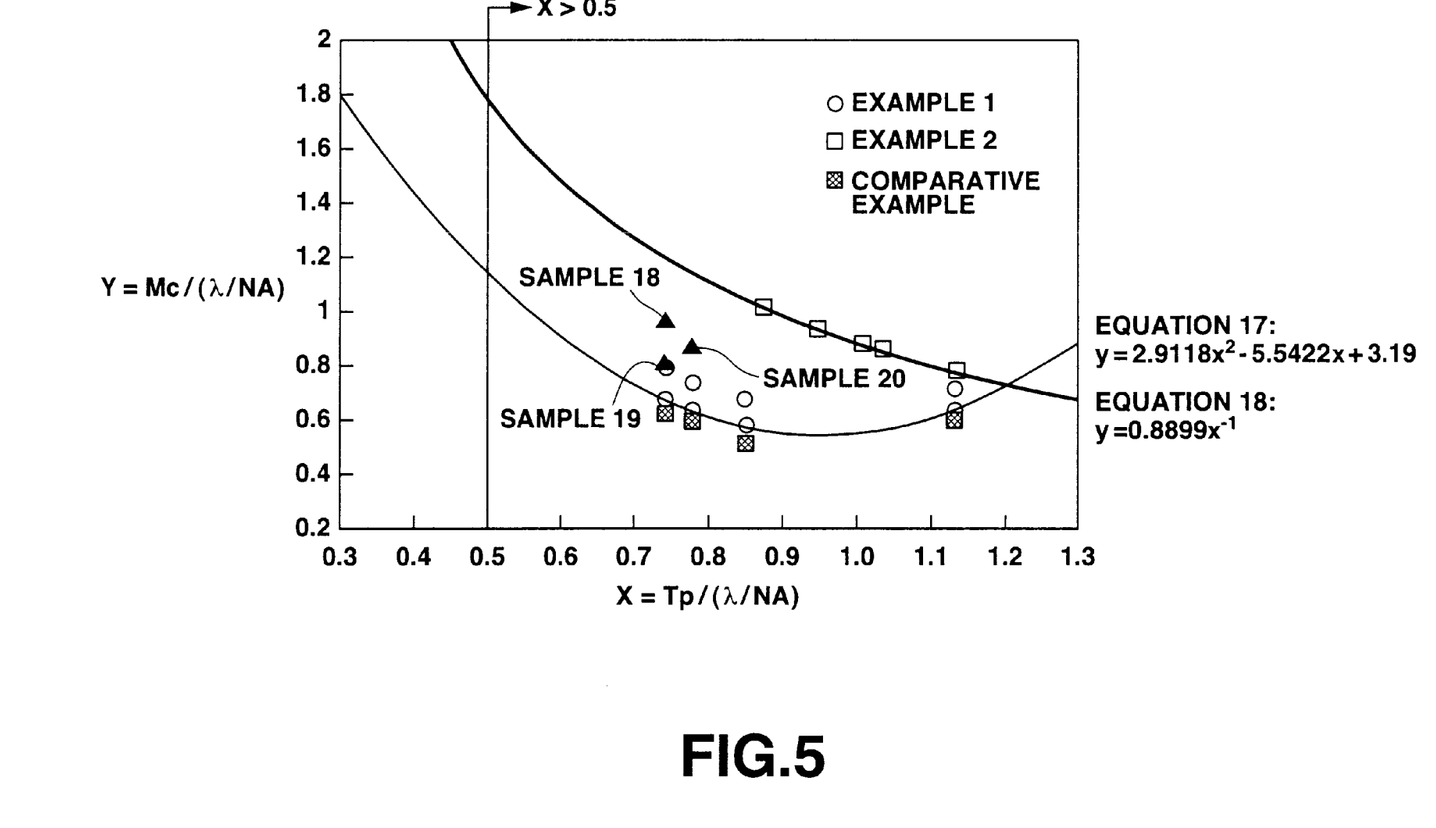
FIG. 5 is a graph showing the results of plotting of the optical recording medium according to the present invention, where X, Y denote the abscissa and the ordinate, respectively.
Figure 6:
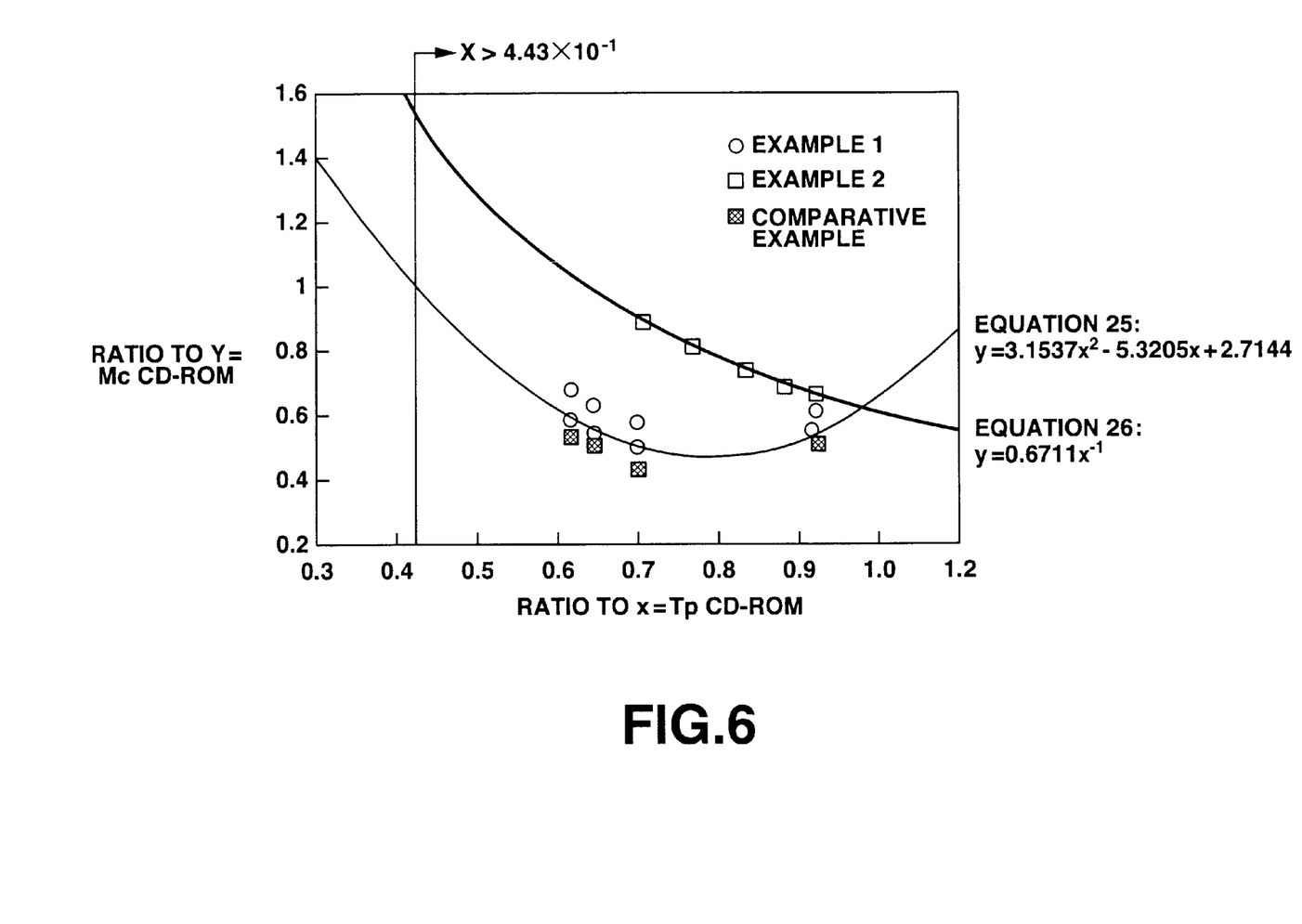
FIG. 6 is a graph, similar to FIG. 5, showing the results of plotting of the optical recording medium according to the present invention, where X, Y denote the abscissa and the ordinate, respectively.

FIG. 5 shows the result of plotting the results of Table 2 for the samples 1 to 17, with X and Y being the abscissa and the ordinate, respectively. FIG. 6 shows the result of plotting the results of Table 2 for the samples 1 to 17, with the ratio (x) of Tp to that of CD-ROM and the ratio of Mc to that of the CD-ROM (y) being the abscissa and the ordinate, respectively.

For showing that the present invention is not dependent on the optical system used for recording and/or reproduction, FIG. 5 also shows the result of plotting of samples 18 to 20 which are recording mediums having an optical system different from the optical system used for recording and/or reproduction from that of the above-mentioned CD-ROM.

TABLE 3

| | $\lambda$($\mu$m) | NA | $\lambda$/NA ($\mu$m) | track pitch Tp ($\mu$m) | X Tp ($\lambda$/NA) | shortest recording mark period ($\mu$m) | Y Mc($\lambda$/NA) | recording capacity (GB) | composition of signal recording layer |
|---|---|---|---|---|---|---|---|---|---|
| sample 18 | 0.65 | 0.6 | 1.08 | 0.80 | 0.74 | 0.88 | 0.81 | 2.60 | NK4295/1.5% solution |
| sample 19 | 0.65 | 0.6 | 1.08 | 0.80 | 0.74 | 1.05 | 0.98 | 2.10 | NK4295/1.5% solution |
| sample 20 | 0.78 | 0.55 | 1.42 | 1.10 | 0.78 | 1.25 | 0.88 | 1.30 | OM57/2.0% solution |

As may be seen from Tables 2, 3 and FIG. 5, the samples 1 to 13 of the first and second embodiment, prepared to satisfy the inequality 17 in accordance with the present invention has a jitter equal to or less than 15% to permit satisfactory reproduction, even with the use of a conventional recording and/or reproducing apparatus, thus assuring compatibility with the conventional optical recording medium. It is also possible to form the track pitch Tp and the shortest recording mark period Mc so as to be shorter than with the standardized pre-existing optical recording mediums, such as CD-ROM, to realize the high recording density and an increased recording capacity.

It may also be seen from FIG. 5 that the sample discs 9 to 13 of the second embodiment are on the curve of the above-mentioned relation 18. Thus, in a region lying above the curve indicated by the relation 18, high recording density can be achieved simply by selecting the ratio of the track pitch Tp and the shortest recording mark period Mc so as to be equivalent to that of the conventional CD or CD-ROM and improving the optical system of the recording and/or reproducing apparatus.

However, it is possible, according to the present invention, to achieve stable recording and/or reproduction in a region lying below the curve shown by the relation 18, that is in a region of a higher recording density.

It may also be seen from Table 2 and FIG. 5 that, in the samples 14 to 17 of the Comparative Example in which the combination of the track pitch Tp and the shortest recording mark period Mc is selected so as not to satisfy the above inequality 17, the jitter at the time of reproduction amounts to 17%, indicating that sufficiently stable recording and/or reproduction cannot be achieved.

As may also be seen from FIG. 6, if the ratios of the track pitch Tp and the shortest recording mark period Mc to those of the CD-ROM are plotted on the abscissa (X) and on the ordinate (Y), the region shown in the above inequality 17 is a region shown by the inequality 25, whilst the region shown by the above relation 19 is a region indicated by the inequality 26:

$$y > 3.1537x^2 - 5.3205x + 2.7144 \quad (25)$$

$$y < 0.6711x^{-1} \quad (26).$$

As in the case of the above relation 22 and the relation 24, in a CD-R having a recording capacity of 650 MB as in the case of the CD-ROM and configured for recording and/or reproducing information signals by an light beam with a wavelength λ of 780 nm with an objective lens having a numerical aperture NA of 0.45, the relation indicated by the following inequality 27:

$$x > 4.43 \times 10^{-1} \quad (27)$$

is desirably met in view of the cut-off frequency.

This enables reliable recording and/or reproduction as the neighboring recording track is reliably checked by the light beam.

It is seen from the results shown in FIG. 6 that, if high recording density is to be achieved as compatibility with respect to the conventional CD or CD-ROM is kept, recording and/or reproduction can be realized reliably in stability by selecting the track pitch Tp and the shortest recording mark period Mc such as to satisfy the relation shown by the inequality 25.

What is claimed is:

1. An optical recording medium in which information signals are recorded and/or reproduced along a recording track, wherein the recording density is made to be higher than that in a standardized pre-existing optical recording medium despite the fact that the modulation/demodulation system for information signals recorded and/or reproduced on or from said recording track is made to be the same as that for said standardized pre-existing optical recording medium, and wherein if the track pitch of said recording track is Tp, the shortest recording mark period in recording on said recording track is Mc, the wavelength of a light beam used in recording and/or reproducing said recording track is λ, and the numerical aperture of the objective lens is NA, the following relation (1) to (3)

$$X = Tp/(\lambda/NA) \quad (1)$$

$$Y = Mc/(\lambda/NA) \quad (2)$$

$$Y > 2.9118X^2 - 5.5422X + 3.19 \quad (3).$$

2. The optical recording medium according to claim 1 wherein the relation (1) to (3) are met and, in addition, the relation shown by the following inequality (4):

$$Y < 0.8899X^{-1} \quad (4)$$

is met.

3. The optical recording medium according to claim 1 wherein the relation (1) to (3) are met and, in addition, the relation shown by the following inequality (5):

$$X > 0.5 \quad (5)$$

is met.

4. The optical recording medium according to claim 1 wherein a row of pits corresponding to EFM-modulated information signals is formed on said recording track.

5. The optical recording medium according to claim 1 wherein a wobbling groove is formed for extending along said recording track;

information signals are recorded and/or reproduced for said recording track based on wobbling signals from said wobbling groove; and wherein the modulation/demodulation system for said wobbling groove is made to be the same as the modulation/demodulation system in said standardized pre-existing optical recording medium.

6. The optical recording medium according to claim 5 wherein signals recorded and/or reproduced for said recording track are EFM-modulated signals and wherein said wobbling signals are FM-modulated signals containing the absolute time information or the address information.

7. A master disc for preparation of an optical recording medium employed in the preparation of an optical recording medium in which information signals are recorded and/or reproduced along a recording track, wherein said master disc has formed thereon a crest-and-groove pattern corresponding to a recording track to be formed on said optical recording medium;

the recording density of said optical recording medium is made to be higher than that in a standardized pre-existing optical recording medium despite the fact that the modulation/demodulation system for information signals recorded and/or reproduced on or from said recording track is made to be the same as that for said standardized pre-existing optical recording medium; and wherein if the track pitch of said recording track is Tp, the shortest recording mark period in recording on said recording track is Mc, the wavelength of a light beam used in recording and/or reproducing said recording track is λ, and the numerical aperture of the objective lens is NA, the following relation (6) to (8)

$$X = Tp/(\lambda/NA) \quad (6)$$

$$Y = Mc/(\lambda/NA) \quad (7)$$

$$Y > 2.9118X^2 - 5.5422X + 3.19 \quad (8).$$

* * * * *